Inventor
Roscoe A. Coffman
By Hutchinson & Hutchinson
Attorney

July 15, 1947.  R. A. COFFMAN  2,423,964
PROCESS OF COOKING MEAT
Filed April 25, 1944  2 Sheets-Sheet 2
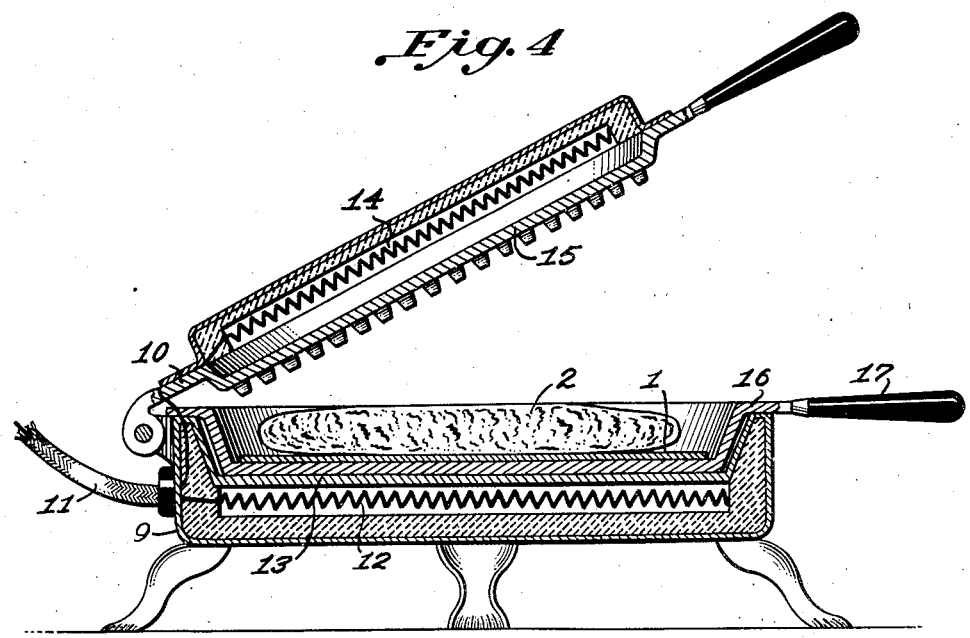
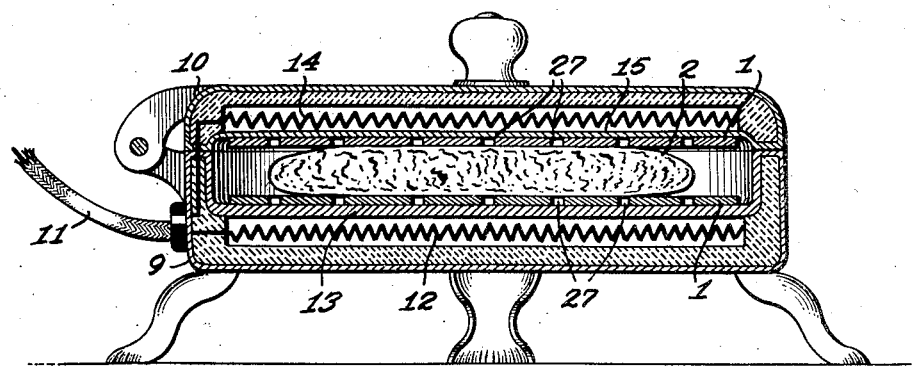
Inventor
Roscoe A. Coffman
By Hutchinson & Hutchinson
Attorney Patented July 15, 1947

2,423,964

UNITED STATES PATENT OFFICE 2,423,964

PROCESS OF COOKING MEAT

Roscoe A. Coffman, Fall Brook, Calif.

Application April 25, 1944, Serial No. 532,671

2 Claims. (Cl. 99—107)

This invention relates to a process for cooking meats and other foods, the present application being a continuation-in-part of my application filed June 1, 1943, and bearing Serial Number 489,303.

The invention provides for the cooking of meats or other foods upon or in contact with a thin veneer sheet of wood or other substance receiving heat from a heated surface, which during the cooking of the meat imparts thereto the peculiarly delicate flavor of wood or other materials after what is commonly known as the "planking" process.

In the carrying out of my improved process, it is a very important obejct of the invention to provide for the use of thin veneer sheets of wood or other substance, which are of such character and of relatively reduced size in so far as thickness and quantity of material are concerned, as to warrant being discarded or thrown away after a single use in the process of "planking" a steak or other food.

Further than the above, it is the purpose of this invention to provide a relatively thin carrier of flavoring ingredients, either in its natural state and/or impregnated with flavoring ingredients, capable of imparting a delicate flavor by transference of heat through the carrier to the meat or other food while in direct contact with said flavoring carrier.

A further object of the invention resides in providing for the cooking of the meat between thin veneer sheets, the meat being supported upon one sheet with a second sheet arranged in contact with the upper surface of the meat being cooked, and a heated surface associated with each one of said veneer sheets, so that the heat is transferred to the meat through said veneer sheets.

Another object is to cook meat or other foods by applying the heat thereto through a thin veneer sheet of wood or like material, and thus imparting to said meat the desired delicate flavor.

A still further object of the invention is to cook meat or other food by the application of all or a part of the cooking heat to said food through a thin veneer sheet of wood or other substance of sufficient thinness to permit a sufficient amount of said heat to pass through said sheet or substance for the purpose of imparting a flavor or aroma or betterment to said food during the heating or cooking process.

Also, it is the object of this invention to utilize a process for cooking food in which pyrolysis is employed in connection with another substance in close proximity to said food during the cooking process.

Another object of the invention is to utilize a thin veneer sheet of wood or other substance pre-impregnated or treated with a pyrolignic substance or with pyroligneous acid, in connection with the cooking of meats or other foods and for the purpose of imparting a flavor or benefit thereto by pyrolysis during the process of cooking said food.

With the above and other objects in view, the invention consists of the improved process and combinations as set forth in the claims, and all equivalents thereof.

In the accompanying drawings in which the same reference characters indicate the same parts in all of the views:

Fig. 4 is a cross sectional view of an electric broiler for use in practicing said improved process, and Fig. 5 is a cross sectional view of a modified form of electric broiler to be used in practicing this invention.

Referring now more particularly to the accompanying drawings, it will appear that the improved process deals with the cooking, frying or broiling of meats and other foods, and in which the meat is in direct contact with a thin veneer sheet I of wood or other substance which in turn receives heat from a heated surface, whereby the heat for cooking said meat is applied through these veneer sheets and imparts to the meat the delicate flavor received from the wood or this other substance.

This process may be practiced in a number of different ways and by the use of various types of implements and utensils, and furthermore, with the thin veneer sheets applied to either the upper or the lower surface of the meat, or both surfaces thereof.

Figure 1:
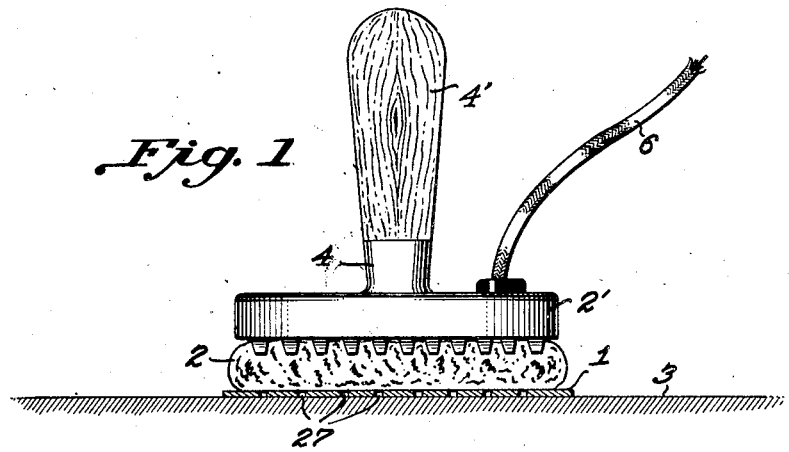
Fig. 1 is a side elevation of an improved implement used in practicing my improved process, the same being electrically heated and shown in contact with the meat being cooked, and with the meat supported upon a thin veneer sheet in contact with a heated surface.

For instance, as shown in Fig. 1, the meat, indicated at 2 is supported on a thin veneer sheet I, which in turn is supported upon and in direct contact with a smooth heated surface, such as a smooth top stove or griddle 3. In this connection, the meat or other food is cooked from below through the thin veneer sheet I, and in order at the same time to cook said meat from above, a heated implement, generally indicated at 4, is provided, which implement, as shown in Fig. 1 is in direct contact with the upper surface of said meat, and is so constructed upon its meat engaging surface, as to constitute the sole means for preventing said meat from shrinking in all directions during the cooking thereof. The planking or flavoring process may also be carried out by applying the thin veneer sheets simultaneously to both the upper and lower surfaces of the meat, as shown for instance in Fig. 2 of the drawings. In this instance, the meat indicated at 2 is supported upon and in direct contact with a thin veneer sheet 1 which in turn is supported upon and in direct contact with a heated surface, such as a smooth top stove or griddle 3, so that said meat may be cooked from below through the veneer sheet as in Fig. 1. However, in this particular instance, a thin veneer sheet 1 is also applied to the upper surface of the meat, and a heated implement of the type shown in Fig. 2 used to directly contact said veneer sheet so as to cook the meat also from above and through said veneer sheet. In this particular instance, the implement is provided with a smooth contacting surface as indicated at 5, which as stated above is in direct contact with the veneer sheet.

Figure 2:
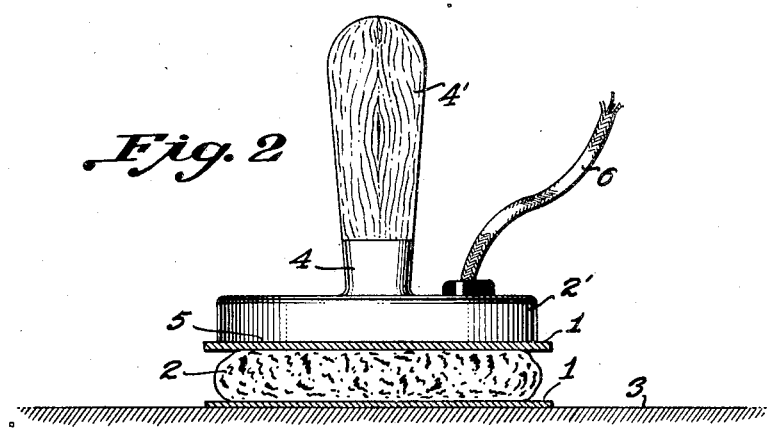
Fig. 2 is a side elevation of a modified form of electric cooking implement.

The implements shown in Figs. 1 and 2 are shown as electrically heated, the electric conducting cord being indicated at 6, but it will be understood that said implements may be otherwise heated in various other ways. When electrically heated, if desired, a two or three point heat control means may be provided, as will be obvious.

Figure 3:
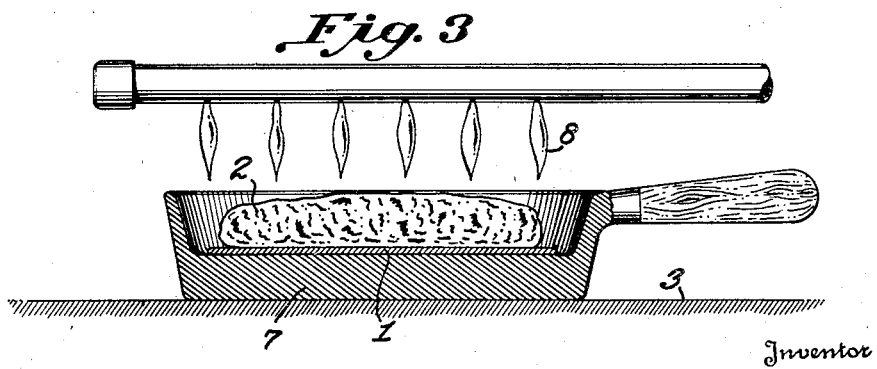
Fig. 3 is a sectional view of a platter used in practicing my improved process under a broiling flame.

Referring now particularly to Fig. 3, it will be noted that the planking process may be carried out by the use of a platter, or other utensil 7 of cast iron, aluminum, or other metal or suitable material, which may be heated by placing the same upon a smooth top stove or griddle 3, or in fact heated or preheated in any other manner. In this particular instance, the thin veneer sheet 1 is placed in direct contact with the cooking surface of the platter and the meat or other food 2 supported upon and in direct contact with said veneer sheet, whereby said meat may be cooked from below through the veneer sheet. This platter, as will be obvious, has sufficient volume of material to hold and retain the proper amount of heat to do the cooking through the veneer sheet placed in the platter and on which the meat is placed, and in this connection, and after the meat is cooked, said platter, due to its heat retaining capacity, will serve to keep the food hot when brought to the table in said platter, and as a matter of fact the meat will still be cooking upon said platter until served. As shown in Fig. 3, the platter 7 may be placed under a gas flame, as indicated at 8, and this so that the meat or other food contained within the platter will be broiled under a broiler flame from above, and at the same time said meat is being cooked from below and through the veneer sheet.

Other types of utensils may be used for carrying out the process disclosed herein, such for instance as those illustrated in Figs. 4 and 5 of the drawings. In Fig. 4 is shown an electric broiler of the portable type and having a main body 9 and a hinged cover 10. An electric cord 11 is adapted for connection with any source of electrical energy and connects the inside of the broiler with an electrical heating resistance wire 12 underneath the heating plate 13 of the body 9, and also with a similar resistance wire 14 within the cover 10. These elements 12 and 14 are connected together and are suitably installed and insulated in any manner well known in the art, hence I am not particularly describing the same in this application. A heating plate 15 forms the bottom side of the cover or lid 10 and extends substantially parallel with the heating plate 13 when the cover 10 is closed.

In the use of this electric broiler as disclosed in Fig. 4, a platter 16 having a heat insulated handle 17 is usually placed within the broiler with its under surface in direct contact with the heating plate 13, and with the handle 17 in a position outside the broiler. This platter is to receive the meat or other food to be cooked, and in this connection the meat is placed within the platter with a thin veneer sheet 1 interposed between the meat and the upper surface of the bottom of said platter. The cover 10 of the broiler is then closed, whereupon the under surface of the heating plate 15 of said cover maintains a position in direct contact with the meat to be cooked or broiled. Under these conditions and with the heated surface of the broiler at the proper temperature, the meat or other food will be cooked from above while in contact with the heating plate 15 and at the same time cooked from below through the veneer sheet 1, which sheet receives heat from the bottom of the platter which in turn receives heat from the heating plate 13. Of course if desired, the platter 16 could be dispensed with and the thin veneer sheet placed directly upon the heating plate 13, with the meat resting thereon, and the upper surface of said meat in direct contact with the heating plate 15. In this Fig. 4 construction, the heating plate 15 with its specially designed meat contacting surface, serves alone to prevent the meat from shrinking in all directions while being cooked, as explained more in detail in my copending application Serial Number 489,303.

In the construction shown in Fig. 5, the electric broiler is quite similar in certain respects to the broiler illustrated in Fig. 4, like parts being represented by the same reference numerals. However, in the Fig. 5 construction, the platter 16 is dispensed with and a thin veneer sheet 1 is placed directly upon the heating plate 13, with the meat resting upon said veneer sheet, and with a second veneer sheet 1 placed in direct contact with the upper surface of the meat being cooked, which second veneer sheet directly contacts the heating plate 15 of the cover or lid 10 when said cover is in closed position. In this particular condition the meat is cooked from above and below, and as will be obvious through the veneer sheets in both instances, the meat thus being sandwiched between said veneer sheets as clearly shown. It will also be noted that in this particular instance the meat engaging surface of the plate 15 is smooth.

In the practicing of this process, particularly where thin sheets of wood or like material are used, the odor or gases from the wood, during the cooking process, are quite pungent, and therefore these gases are of course impregnating the food during the cooking process. In other words, the process may be considered as a process of gasifying the substances of the wood by distillation and the transference of said gases of distillation directly into the meat or other food during the cooking process herein described.

Also, it might be stated that this process of cooking foods is in certain respects one in which pyrolysis is employed in connection with another substance in close proximity to said food during the cooking process, and for the purpose of imparting to the food a flavor or betterment thereto.

Furthermore, and in practicing this process, it has been found that the veneer sheets may be sprayed, brushed, or otherwise treated with a suitable liquid, powder or substance to impregnate or coat said sheets, which liquid, powder, or other substance when put into use in the cooking process, will be gasified or otherwise transformed by heat, and during transformation a desirable flavor may be imparted to the food being cooked thereon or in direct contact therewith. This in conjunction with the fumes from the natural wood of the veneer sheet (if wood sheets are used) tends to impart to the food a distinctive flavor. In this same connection, it has also been found that the wood veneer sheet or other substance may be dusted with wheat flour, or whole wheat flour, or buckwheat flour, or a finely parted sawdust or wooddust, or condiments, such as ground cuminos, paprika, caraway seed, flour, black pepper, cloves, sage, thyme, powdered bay leaves, celery salt, garlic salt, sweet marjoram, nutmeg, mace, pickling spices, or a mixture of these or any other spices or condiments or flavoring substances for the purpose of imparting during the cooking process a distinctive flavor or aroma to the food. Also combinations of various powders, spices or condiments may be applied in a proper blend to give the desired flavor.

It has also been found that among the liquids and extracts, the wood or other carrier substance, may not only be impregnated with a pyrolignic substance, but also impregnated with garlic oil, garlic juice, onion juice or olive oil, cotton seed oil, corn oil or copra oil, and in this connection, some of these oils may be lightly sprayed onto the wood or other carrier substance. Furthermore, it has been found that by the use of certain flavors and condiments herein mentioned in the cooking of meat, the meat is not only given a more delicate flavor but is tenderized.

It is also within the scope of this improved process to impregnate or otherwise treat wood or other substances with wines, brandies or liquors for the purpose of imparting to the food flavors or aromas and/or tenderizing the meat during the cooking process.

As to the application of liquids or extracts to be carried by the thin veneer sheets, and for use in this improved cooking process, these liquids and extracts may be sprayed or brushed or rolled on lightly, or if deemed advisable, the wood or other substance may be dipped as is obvious. Also, as will be understood, condiments, spices and flours or powders, may be dusted onto the wood or other substance, or they may be rolled onto the carrier, and further if found desirable, these powdered materials may be mixed with a proper binder such as vegetable, mineral or animal oil and sprayed or brushed thereon. The wines, brandies, liquors or cordials may be applied to the carrier by spraying, brushing or dipping as will be readily understood.

Certain of the cooking implements described herein are particularly useful and adapted for the cooking or frying of hamburgers and the like, which hamburgers are usually fried from below upon a smooth cooking surface, and this for the reason that said implement not only cooks the hamburger from above while it is frying from below on the smooth cooking surface, but also constitutes a means for preventing the hamburger from shrinking in all directions during cooking. The hamburger after being cooked in the manner just set forth, may then be readily lifted from the smooth cooking surface with a spatula or other implement, such as a pancake turner or the like. It may be well to mention at this point that it has been found, particularly in the use of thin veneer sheets of wood, and especially where the meat is interposed between two veneer sheets of wood, the meat is prevented from shrinking in all directions during the cooking process.

As regards the carrier for these flavoring ingredients, substances other than wood may be used, as for instance a thin sheet of asbestos or thinly woven asbestos cloth, cotton or linen cloth, fine fibers from bamboo or rattan, or in fact, fine metal wire cloth, and in connection with such last mentioned material, namely fine metal wire cloth, it is to be noted that the said carrier may be used over and over again and treated with the flavoring ingredients just prior to its use in the cooking process. Also, paper substance, such as a type of blotting paper or other paper of odorless and tasteless characteristics, may be used as a carrier, but in this connection, the paper carrier would be used on a cooler griddle than used for wood sheets, the griddle being sufficiently cooler so as not to scorch the paper, but having sufficient heat imparted thereto to permit the flavoring ingredients carried by said paper substance to be transferred to the food during the cooking process. Again, and in practicing this process, two pieces of thin asbestos cloth may be placed together with the flavoring ingredients between them, in which event the aroma or fumes would pass through the asbestos cloth and be imparted to the food.

Furthermore, when using cloth or like carriers, the cloth is cut to approximately the size of the meat or other food being cooked, and then impregnated with flavoring ingredients, it being of course desirable and necessary to permit this type of carrier during the cooking process to be placed on a heated griddle or other cooking surface of sufficiently cool temperature (slightly above boiling) so as not to scorch or drive therefrom undesirable fumes or gases out of the material from which the carrier may be made. In the use of this carrier of cloth or other like substance, as above outlined, the carrier may be placed between the food and the heated cooking surface during part of the time the food is being cooked (namely a sufficient space of time to impart the desired flavor to the food), and then the completion of the cooking of said food may be accomplished after the removal of the flavoring carrier. However, in the use of thin wood sheets and like substances, it is advisable to complete the cooking process while the food is in contact with said wood sheets.

Furthermore, it is to be understood that the veneer sheets 1 may, if desired, be perforated as at 27, and this for the purpose of affording greater transfer of heat through the veneer sheets to the meat being cooked.

And also the veneer sheets may be made of wood, such as oak, hickory, or any other wood, material or substance, which will give to the meat the peculiarly delicate flavor desired, as described herein.

From the foregoing description, it will be readily seen that I have provided an improved process which will bring about the results desired, and furthermore have produced implements for carrying out such process as substantially fulfill the objects of the invention as set forth herein.

While this specification sets forth in detail the present and preferred construction of implements for carrying out the improved process, still in practice such deviations from such details may be resorted to as do not form a departure from the spirit of the invention, as defined by the appended claims.

Having thus described my invention, what I claim as new and useful and desire to secure by Letters Patent is:

1. The process of cooking meat which consists of applying the cooking heat to the meat through a thin veneer sheet of wood, the sheet being thin enough to permit the passage of substantially all the heat required to cook the meat and the heat being intense enough to generate gases of distillation in the wood so as to flavor the meat.

2. The process of cooking meat which consists of applying the cooking heat to the meat through a thin veneer sheet of flavor carrying substance, the sheet being thin enough to permit the passage of substantially all the heat required to cook the meat and the heat being intense enough to generate flavoring gases in the sheet so as to flavor the meat.

ROSCOE A. COFFMAN.

REFERENCES CITED

The following references are of record in the file of this patent:

UNITED STATES PATENTS

| Number | Name | Date |
|---|---|---|
| 764,496 | Overton | July 5, 1904 |
| 2,116,310 | Harvey | May 3, 1938 |
| 2,199,584 | Bemis | May 7, 1940 |
| 2,191,275 | Funk | Feb. 20, 1940 |
| 1,790,194 | Amacher | Jan. 27, 1931 |
| 1,300,504 | Speaks | Apr. 15, 1919 |